United States Patent
Mirzoyan et al.

(10) Patent No.: US 12,230,243 B2
(45) Date of Patent: Feb. 18, 2025

(54) USING TOKEN LEVEL CONTEXT TO GENERATE SSML TAGS

(71) Applicant: MICROSOFT TECHNOLOGY LICENSING, LLC, Redmond, WA (US)

(72) Inventors: Mikayel Mirzoyan, San Francisco, CA (US); André Aing, Dublin (IE); Aysar Khalid, Redmond, WA (US); Chad Joseph Lynch, Lansdale, PA (US); Graham Michael Reeve, Redmond, WA (US); Sadek Baroudi, Berkeley, CA (US); Vidush Vishwanath, Santa Clara, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 213 days.

(21) Appl. No.: 17/566,554

(22) Filed: Dec. 30, 2021

(65) Prior Publication Data

US 2023/0215417 A1 Jul. 6, 2023

(51) Int. Cl.
*G10L 13/027* (2013.01)
*G10L 13/06* (2013.01)
*G10L 13/08* (2013.01)

(52) U.S. Cl.
CPC ............ *G10L 13/027* (2013.01); *G10L 13/06* (2013.01); *G10L 13/08* (2013.01)

(58) Field of Classification Search
CPC ........ G10L 13/027; G10L 13/06; G10L 13/08
See application file for complete search history.

(56) References Cited

U.S. PATENT DOCUMENTS

| 8,146,005 B2 | 3/2012 | Jones et al. |
| 10,276,149 B1 | 4/2019 | Liang et al. |

(Continued)

FOREIGN PATENT DOCUMENTS

| CN | 108231059 B | 6/2021 | |
| WO | WO-2019217128 A1 * | 11/2019 | ............ G06F 40/211 |

OTHER PUBLICATIONS

WO-2019217128-A1 (Year: 2019).*

(Continued)

*Primary Examiner* — Bhavesh M Mehta
*Assistant Examiner* — Darioush Agahi
(74) *Attorney, Agent, or Firm* — Newport IP, LLC; Jacob P. Rohwer

(57) ABSTRACT

This disclosure describes a system that analyzes a corpus of text (e.g., a financial article, an audio book, etc.) so that the context surrounding the text is fully understood. For instance, the context may be an environment described by the text, or an environment in which the text occurs. Based on the analysis, the system can determine sentiment, part of speech, entities, and/or human characters at the token level of the text, and automatically generate Speech Synthesis Markup Language (SSML) tags based on this information. The SSML tags can be used by applications, services, and/or features that implement text-to-speech (TTS) conversion to improve the audio experience for end-users. Consequently, via the techniques described herein, more realistic and human-like speech synthesis can be efficiently implemented at larger scale (e.g., for audio books, for all the articles published to a news site, etc.).

19 Claims, 7 Drawing Sheets

(56) References Cited

U.S. PATENT DOCUMENTS

| | | | |
|---|---|---|---|
| 2010/0042410 A1 | 2/2010 | Stephens, Jr. | |
| 2010/0174533 A1 | 7/2010 | Pakhomov | |
| 2011/0295590 A1 | 12/2011 | Lloyd et al. | |
| 2012/0239390 A1* | 9/2012 | Fume | G10L 13/10 |
| | | | 704/220 |
| 2015/0286627 A1 | 10/2015 | Chang et al. | |
| 2020/0279551 A1 | 9/2020 | Sung | |
| 2020/0279553 A1 | 9/2020 | Mcduff et al. | |
| 2021/0110811 A1* | 4/2021 | Joseph | G10L 13/08 |
| 2022/0351714 A1* | 11/2022 | Yang | G10L 13/047 |
| 2023/0317057 A1 | 10/2023 | Mirzoyan et al. | |

OTHER PUBLICATIONS

"International Search Report and Written Opinion issued in PCT Application No. PCT/US22/052194", Mailed Date: Mar. 28, 2023, 12 Pages.

"International Search Report and Written Opinion Issued in PCT Application No. PCT/US23/012967", Mailed Date: May 3, 2023, 11 Pages.

Non-Final Office Action mailed on May 3, 2024, in U.S. Appl. No. 17/710,733, 10 pages.

Notice of Allowance mailed on Aug. 28, 2024, in U.S. Appl. No. 17/710,733, 8 pages.

* cited by examiner

| Token Number | Token Text | Character Count | Token Count (Per Sentence) | Sentiment | Part of Speech | Entity | Character |
|---|---|---|---|---|---|---|---|
| 1 | Contoso | 7 | 12 | Excited | Noun | Organization | Sue |
| 2 | Entertainment | 13 | 12 | Excited | Noun | Organization | Sue |
| 3 | Announced | 9 | 12 | Excited | Verb | No | Sue |
| 4 | A | 1 | 12 | Excited | Indefinite Article | No | Sue |
| 5 | Concert | 7 | 12 | Excited | Noun | No | Sue |
| 6 | By | 2 | 12 | Excited | Preposition | No | Sue |
| 7 | Mauve | 5 | 12 | Excited | Noun | Organization | Sue |
| 8 | In | 2 | 12 | Excited | Preposition | No | Sue |
| 9 | Beautiful | 9 | 12 | Excited | Adjective | No | Sue |
| 10 | Las | 3 | 12 | Excited | Noun | Location | Sue |
| 11 | Vegas | 5 | 12 | Excited | Noun | Location | Sue |
| 12 | ! | 1 | 12 | Excited | N/A | No | Sue |

Data Structure 300

FIG. 3

USING TOKEN LEVEL CONTEXT TO GENERATE SSML TAGS

BACKGROUND

Text-to-speech (TTS) conversion is a component used in many computer- and/or network-based services to synthesize and output speech (e.g., AMAZON's ALEXA, MICROSOFT's CORTANA, etc.). Additionally, TTS conversion plays an important part in accessibility features, which are designed and implemented to help people with vision impairment or dyslexia, for example. Unfortunately, many of the computer- and/or network-based services that implement TTS conversion output a monotone narration of the text. This has a negative effect on the user experience because a listener is deprived of fully understanding the prosody (e.g., intonation, stress, rhythm, etc.) associated with pieces of text converted to speech.

There are some existing TTS conversion services that attempt to address this problem by associating Speech Synthesis Markup Language (SSML) tags with plain text to make the computer-based speech synthesis sound more human-like. However, these existing TTS conversion services require manual curation of the SSML tags, which requires significant human effort. More specifically, users must sit and enter the information into a large number of SSML tags for a body of text, which can then be used to synthesize the speech for output via an audio device.

With the increasing amount of text available for consumption across a variety of user devices, and the fact that more and more users are now using products (e.g., devices, applications, features, etc.) that implement TTS conversion and speech synthesis for accessibility, multitasking, and other purposes, the existing TTS conversion services are unable to scale and are clearly ineffective at generating SSML tags in an efficient manner. Consequently, the end-user experience is negatively affected because the speech output is often monotone and robotic, rather than more human-like.

It is with respect to these and other considerations that the disclosure made herein is presented.

SUMMARY

This disclosure describes a system that analyzes a corpus of text (e.g., a financial article, an audio book, a messaging conversation, etc.) so that the context surrounding the text is fully understood. For instance, the context may be an environment described by the text, or an environment in which the text occurs. Based on the analysis, the system automatically generates Speech Synthesis Markup Language (SSML) tags which can be used by applications, services, and/or features that implement text-to-speech (TTS) conversion to improve the audio experience for end-users. For example, the SSML tags can be associated, via position or location in the corpus of text, with a word or a group of words. Consequently, via the techniques described herein, more realistic and human-like speech synthesis can be efficiently implemented at a larger scale (e.g., for lengthy audio books, for all the articles published to a news site, etc.).

The analysis can implement various natural language processing techniques to produce contextual information for the corpus of text, such as sentiment and/or part of speech. For example, the sentiment of the text can be categorized into different emotional states such as "Happy", "Sad", "Angry", "Surprised", "Excited", "Fearful", "Shameful", "Disgusted", "Anticipation", "Confident", "Pity", "Awkward", "Hesitant", "Loving", "Neutral" (e.g., non-sentimental), and so forth. The part of speech can categorize different words as a noun, a verb, an adjective, an adverb, a pronoun, a preposition, a conjunction, an interjection, and so forth. The system can produce speech output characteristics which are included in an SSML tag so that the synthesized speech more accurately reflects the context of the text with respect to the sentiment and/or the part of speech. In various examples, the determined sentiment can be transformed into a value in a normalized sentiment range (e.g., zero to one). Values toward the lower end of the range may be associated with "negative" sentiment while values toward the higher end of the range may be associated with "positive" sentiment. In this way, the determined sentiments become more and more positive as the value increases within the range.

In further implementations, the analysis can implement various natural language processing techniques to produce contextual information that recognizes different types of entities in the text (e.g., a person, a place, an organization, a product, an item, etc.). An entity may refer to a name or a label of something. Entity recognition can be used by the system to improve the manner in which the name or label is output with respect to rate of speech, pitch, contour, duration, and/or whether there is typically a pause between text strings in the name of the entity (e.g., Los Angeles, Yellowstone National Park, etc.).

In even further implementations, the analysis can implement various natural language processing techniques to produce contextual information that identifies human characters in the text (e.g., characters in an audio book, participants in a text messaging conversation, etc.), as well as any character attributes that can be used to implement variations in the speech of the human character (e.g., age, gender, nationality and/or geographic location, type of personality, etc.). For example, older people are more likely to speak slower than younger people. In another example, females are more likely to speak in a higher pitch when compared to males. In yet another example, human characters with specific nationalities, or that are from specific geographic locations, may be more likely to speak at a particular rate. In a further example, human characters with an outgoing personality are likely to sound more excited and speak loudly compared to a human character that is more introverted.

The system can use the contextual information to produce speech output characteristics for the text. The speech output characteristics are ones that can be defined in SSML tags, such as a volume, a pitch, a rate of speech, a contour, a duration, a pause before a word is spoken (e.g., a defined time period such as a half of a second), contour, etc. Accordingly, the system described herein can automatically generate SSML tags for a corpus of text based on the analysis, implemented via natural language processing techniques, that produces contextual information such as sentiment, part of speech, recognized entities, and/or human character and attribute identification.

As described herein, the analysis and SSML tag generation can be implemented at the token level for more focused speech synthesis characteristics. This enables a computing device to generate more accurate, human-like, voice output. In one example, a token can include a string of characters (e.g., a single word in any of multiple different language) between two different spaces or punctuation marks. In this example, an instance of a punctuation mark can also be considered a token. A punctuation mark can include a period (.), a comma (,), a colon (:), a semicolon (;), a hyphen (-), a slash (/), etc. In another example, a token can include an N number of words (e.g., N=2 (bigram), N=3, N=4, N=5, etc.). Consequently, via the automatic contextual understanding and SSML tag generation at the token level, the system described herein is able to produce a variety of speech output characteristics for a smaller amount of text (e.g., a single word, two words, three words, etc.), which is able to make the speech synthesis implemented by a computing device sound more human-like.

The system aggregates the contextual information for individual tokens within a data structure. When it is time to generate the SSML tags, the system extracts different pieces of the contextual information at the token level and applies an algorithm to the extracted contextual information. The algorithm applies one or more rules to the extracted contextual information to produce speech output characteristics for an individual token. In one example, a rule can be a hard coded rule that increases or decreases a baseline value established for a speech output characteristic (e.g., a volume, a pitch, a rate of speech, a contour, a duration, etc.) by a predetermined amount. For example, the rule can define that if a noun follows an adjective that is associated with a positive sentiment (e.g., happy, excited, etc.), then the pitch of the noun or the pitch of the sentence in which the noun occurs is to increase by twenty percent compared to a baseline value. Alternatively, a hard coded rule can set a speech output characteristic to a predetermined value based on the contextual information. For example, the rule can define that if a noun follows the adjective that is associated with the positive sentiment, then the volume of the noun or the volume of the sentence in which the noun occurs is set to eighty percent of a maximum volume. Other examples can include: (i) if the sentiment for a sentence is negative (e.g. transformed to a value between 0 and 0.3), then the volume is changed to 50, (ii) if the sentiment for a sentence is negative, then insert a pause at the end of the sentence, (iii) if the token is a superlative adjective and its token sentiment is higher than a threshold value in a normalized sentiment range (e.g., 0.4), then change the rate of speech to a set speed that is "slow", (iv) if the token is a noun and its token sentiment is higher than a threshold value in a normalized sentiment range (e.g., 0.4), then change the speech rate to 0.95.

In further examples, the rule can be a proportional rule that maps a piece of contextual information to a value in a range of values established for a speech output characteristic. For example, the rate of speech for a sentence can be based on where the sentiment falls on a spectrum. Sentiments that are known to fall on the negative side of the spectrum can have an associated rate of speech that is generally slower compared to sentiments that are known to fall on the positive side of the spectrum, which have an associated rate of speech that is faster. In another example, an age of a human character can be mapped to a specific rate of speech value in a range of values. In this scenario, the mapping is implemented to capture how older people typically talk slower compared to younger people.

In various examples, more than one rule can be applied to produce the speech output characteristics for an individual token. This is likely to occur when the system associates different types of contextual information with the individual token (e.g., a sentiment, a part of speech, and a female human character that is seventy years old). Moreover, the rules (e.g., hard coded and/or proportional rules) can be established via a machine learning approach. For example, the system described herein can use training data, which can be human-labeled as high quality examples of speech output, to establish the rules. The system can analyze the training data to determine optimal speech output characteristics based on the contextual information extracted from the training data (e.g., sentiment, part of speech, recognized entities, identified human characters and their attributes, etc.).

In various implementations, the system described herein can be implemented as a separate standalone service (e.g., a network-based service) that, when called upon by a client (e.g., a news organization, an audio book publisher, a text-based communication or social media application, a feature of an "app" or the operating system of a user device, etc.), can take a corpus of text as an input and output SSML tags for the text. For instance, an individual SSML tag can be associated, via a position or location indicator in the corpus of text, with a token or a group of tokens so speech can be synthesized in an efficient manner. Alternatively, an individual SSML tag can be associated with a token or a group of tokens via a wrapping technique where the SSML tag is wrapped around the token or the group of tokens (e.g., <SSML1>happy</SSML1><SSML2>day</SSML2>). The client can then provide and/or process the SSML tags associated with the text so that user devices can audibly output voice data using speech synthesis. This allows the client to have or provide a more human-like text-to-speech experience to their end-users. For example, via the understanding of the context, the disclosed techniques can enable a speech synthesis feature to (i) read tragic news with the appropriate weight, (ii) give life to audio books with multiple character voices, or (iii) sound more like participants in a group messaging conversation (e.g., a video game chat, a text message string, an email thread, etc.). In a more specific example, the system can enable a news provider application to output "a giant panda has given birth to tiny twin cubs" differently than "the lava engulfed a school and hundreds of people lost their houses". The first output should include speech output characteristics that sound happy and cheerful, while the second output should include speech output characteristics that sound sad and empathetic.

Consequently, the disclosed techniques provide a technical solution to a technical problem that stems from the inability for existing TTS conversion services to effectively and efficiently generate SSML tags. The disclosed techniques provide a better audio/voice output experience for end-users across a variety of different applications because the speech synthesis is significantly more realistic and human-like. The end-user may want to engage with the TTS conversion and speech synthesis features of applications for disability purposes, for safety purposes (e.g., a user should not be reading text while driving or even walking down a crowded sidewalk), or for multitasking purposes.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 is a diagram illustrating example token-level entries into a data structure, where each token-level entry includes contextual information such as sentiment, part of speech, entity recognition, and/or human character identification.

DETAILED DESCRIPTION

This disclosure describes a system that analyzes a corpus of text (e.g., a financial article, an audio book, a messaging conversation, etc.) so that the context surrounding the text is fully understood. For instance, the context may be an environment described by the text, or an environment in which the text occurs. Based on the analysis, the system automatically generates Speech Synthesis Markup Language (SSML) tags which can be used by or in association with applications, services, and/or features that implement text-to-speech (TTS) conversion to improve the audio experience for end-users. Consequently, via the techniques described herein, more realistic and human-like speech synthesis can be efficiently implemented at larger scale (e.g., for lengthy audio books, for all the articles published to a news site, etc.). Various examples, scenarios, and aspects described below with reference to FIGS. 1-6.

Figure 1A:
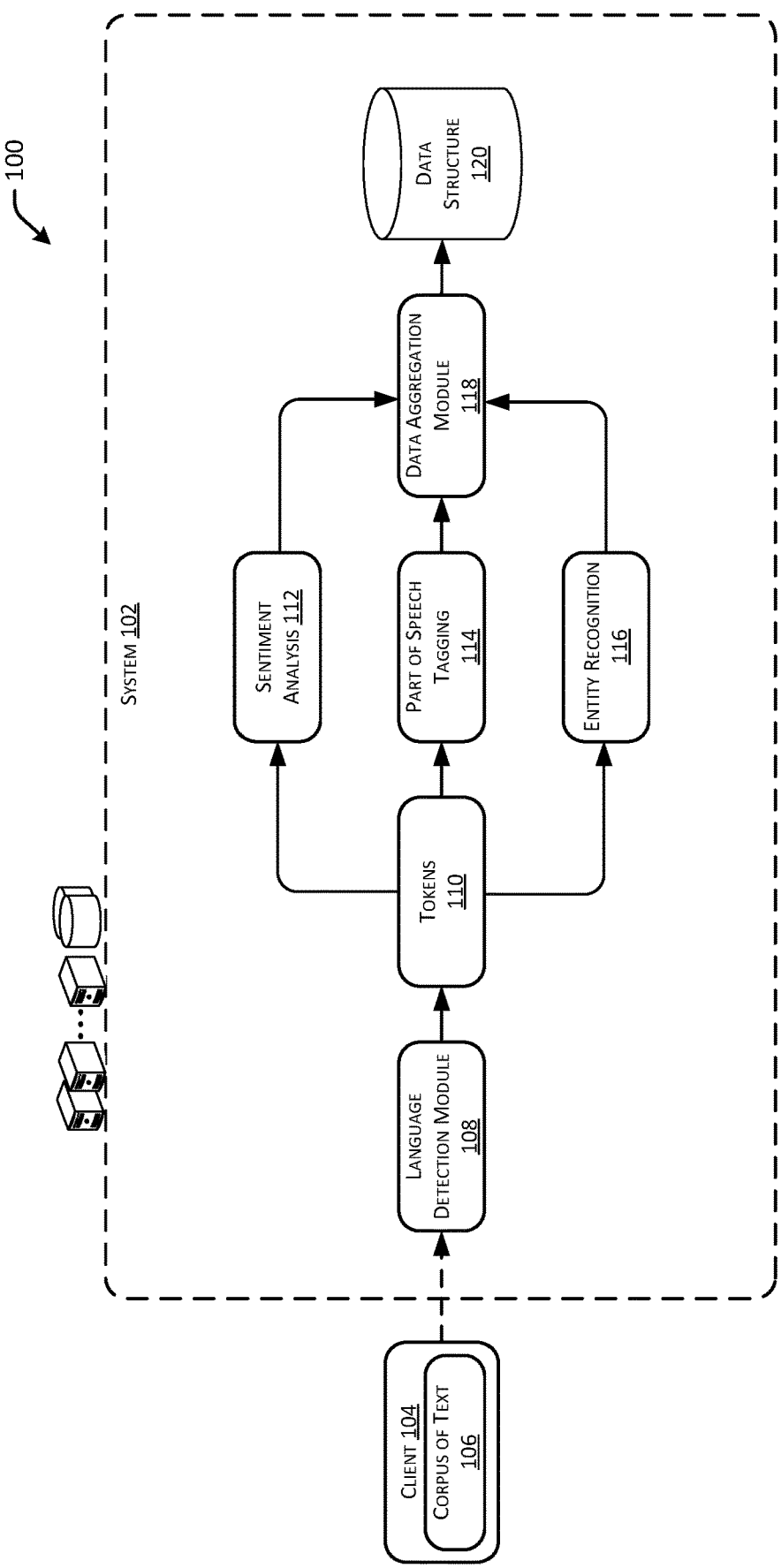
FIG. 1A is a diagram illustrating an example environment in which a system receives a corpus of text and performs contextual analysis on the corpus of text to determine contextual information, such as sentiment, part of speech, and/or entity recognition, that can be stored in a data structure at the token level.

FIG. 1A is a diagram illustrating an example environment 100 in which a system 102 receives a corpus of text and performs contextual analysis on the corpus of text to determine contextual information, such as sentiment, part of speech, and/or entity recognition, that can be stored in a data structure at the token level. The system 102 can include device(s) (e.g., servers, storage devices, etc.) that are associated with a service that is associated with the conversion from text to speech. The device(s) and/or other components of the system 102 can include distributed computing resources that communicate with one another, and with remote devices, via one or more network(s). The network(s) can include, for example, public networks such as the Internet, private networks such as an institutional and/or personal intranet, or some combination of private and public networks. Network(s) 114 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 114 can utilize communications protocols, including packet-based and/or datagram-based protocols such as internet protocol (IP), transmission control protocol (TCP), user datagram protocol (UDP), or other types of protocols. Moreover, network(s) 114 can also include a number of devices that facilitate network communications and/or form a hardware basis for the networks, such as switches, routers, gateways, access points, firewalls, base stations, repeaters, backbone devices, and the like.

As shown in FIG. 1A, a client 104 (e.g., a news organization, an audio book publisher, a text-based communication or social media application, an operating system of a user device, etc.) can provide a corpus of text 106 to the system 102. The system 102 uses a language detection module 108 to analyze the corpus of text. For instance, the language detection module 108 can use one of various natural language processing techniques to produce contextual information for the corpus of text at the token level, or for individual tokens 110. The language detection module 108 implements the contextual analysis at the token level for more focused speech synthesis characteristics. This enables a computing device to generate more accurate, human-like, voice output. In one example, a token 110 can include a string of characters (e.g., a single word in any of multiple different language) between two different spaces or punctuation marks. In this example, an instance of a punctuation mark can also be considered a token 110. A punctuation mark can include a period (.), a comma (,), a colon (:), a semicolon (;), a hyphen (-), a slash (/), etc. In another example, a token 110 can include an N number of words (e.g., N=2 (bigram), N=3, N=4, N=5, etc.). Consequently, via the automatic contextual understanding at the token level, the system 102 described herein is able to produce a variety of speech output characteristics for a smaller amount of text (e.g., a single word, two words, three words, etc.), which is able to make the speech synthesis implemented by a computing device sound more human-like.

Moving on, FIG. 1A illustrates a sentiment analysis 112 performed on individual tokens 110, or groups of tokens 110, by the language detection module 108. The sentiment analysis 112 yields the sentiment of a token 110, or a group of tokens 110. For example, the sentiment can be categorized into different emotional states such as "Happy", "Sad", "Angry", "Surprised", "Excited", "Fearful", "Shameful", "Disgusted", "Anticipation", "Confident", "Pity", "Awkward", "Hesitant", "Loving", "Neutral" (e.g., non-sentimental), and so forth. FIG. 1A further illustrates part of speech tagging 114 performed on individual tokens 110 by the language detection module 108. The part of speech tagging 114 categorizes different words in a token 110 as being a noun, a verb, an adjective, an adverb, a pronoun, a preposition, a conjunction, an interjection, and so forth. FIG. 1A also illustrates entity recognition 116 performed on individual tokens 110, or a group of tokens 110, by the language detection module 108. The entity recognition 116 identifies different types of entities in the text (e.g., a person, a place, an organization, a monument, a location, a product, an item, etc.). An entity may refer to a name or a label of something.

In various examples, the determined sentiment can be transformed into a value in a normalized sentiment range (e.g., zero to one). Values toward the lower end of the range may be associated with "negative" sentiment while values toward the higher end of the range may be associated with "positive" sentiment. In this way, the determined sentiments become more and more positive as the value increases within the range.

The system 102 further includes a data aggregation module 118 that aggregates the different types of contextual information (e.g., sentiment, part of speech, and/or entity name or label) for individual tokens 110 within a data structure 120. The data structure 120 provides a mechanism for contextual information to be extracted at the token level, so that SSML tags can be generated, as described below with respect to FIG. 2. In some examples, the data structure 120 includes a relational database with one or more tables, indices, stored procedures, and so forth to enable data access.

Figure 1B:
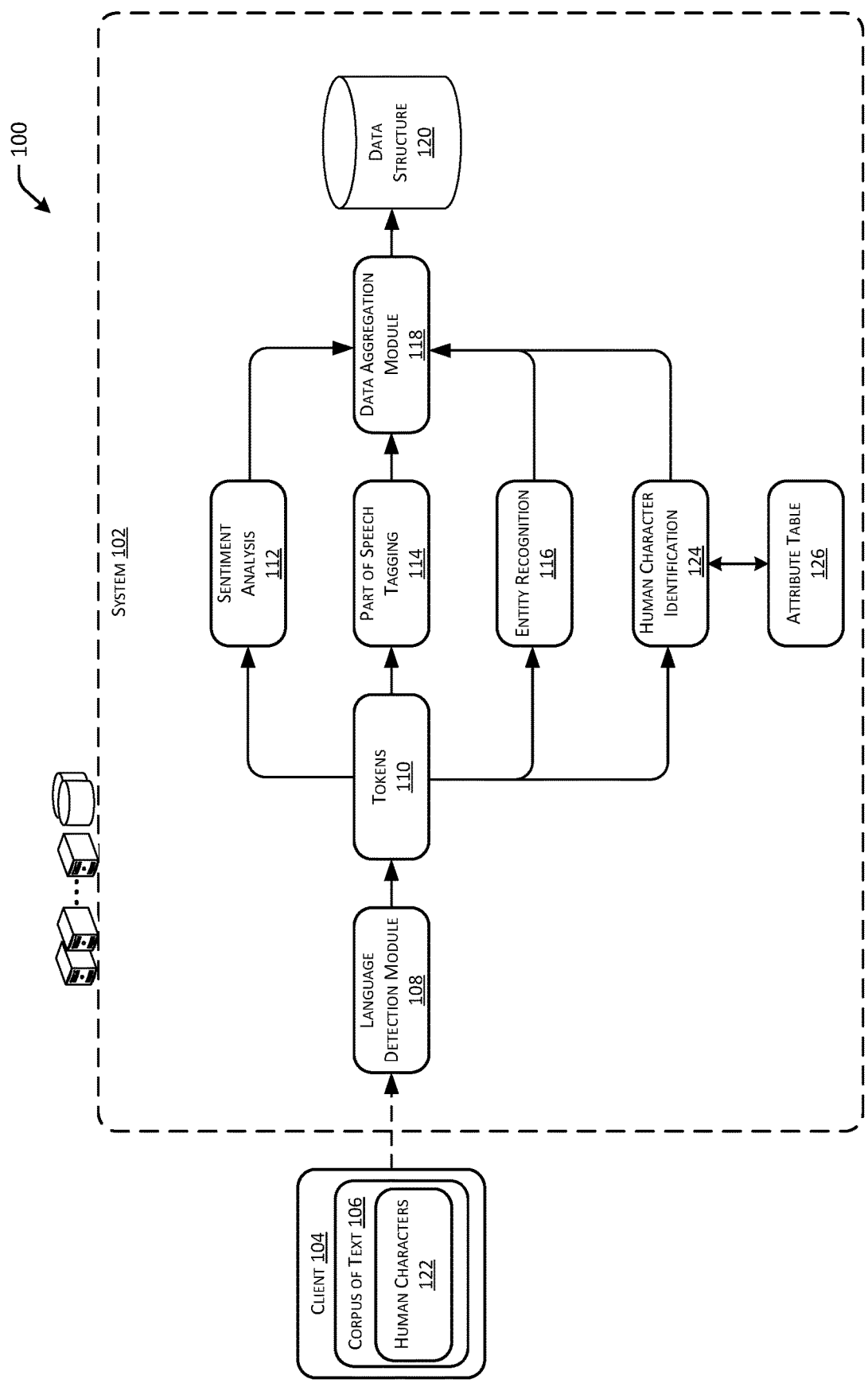
FIG. 1B is a diagram illustrating the example environment of FIG. 1A, where the contextual information includes human character identification and attribute extraction.

FIG. 1B is a diagram illustrating the example environment 100 of FIG. 1A, where the contextual information can additionally or alternatively include human character identification and attribute extraction. As illustrated in FIG. 1B, the corpus of text 106 includes text spoken and/or written by different human characters 122. In one example, the human characters 122 may be fictional people that part of a story or an audio book. In another example, the human characters 122 may be real people that are participants in a group messaging conversation (e.g., a text message string, an email thread, etc.).

Compared to FIG. 1A, FIG. 1B further illustrates that human character identification 124 is performed on individual tokens 110, or groups of tokens 110, by the language detection module 108. The human character identification 124 determines whether or not tokens 110 should be assigned to individual human characters 122 that are a source of a piece of text or can be identified via the piece of text. For instance, an audio book may include quoted text that is spoken by a fictional human character. Or, a messaging conversation may include an individual message submitted or sourced by a particular user.

Furthermore, the human character identification 124 is configured to identify and extract character attributes from the corpus of text or other available sources (e.g., a user profile associated with an account), and store the character attributes in an attribute table 126. The character attributes can be ones that have a general effect on variations in human speech, such as age, gender, nationality and/or geographic location, type of personality, etc. For example, older people are more likely to speak slower than younger people. In another example, females are more likely to speak in a higher pitch when compared to males. In yet another example, characters with specific nationalities or that are from specific geographic locations may be more likely to speak at a particular rate (e.g., faster or slower than a normal rate). In a further example, characters with an outgoing personality are likely to sound more excited and speak loudly compared to characters that are introverted.

Figure 2:
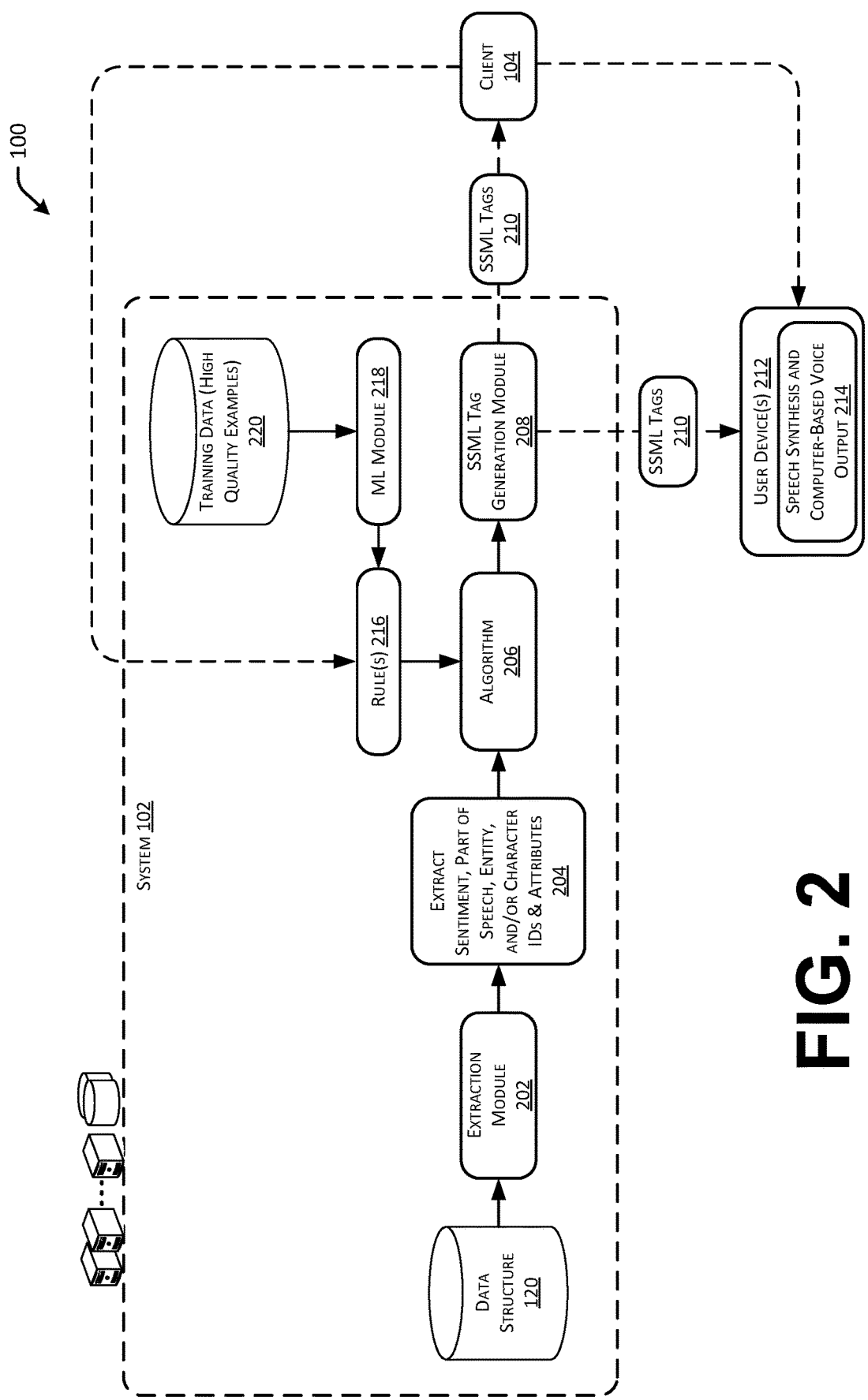
FIG. 2 is a diagram further illustrating the example environment of FIG. 1A and FIG. 1B, where the data structure is used at the token level to generate Speech Synthesis Markup Language (SSML) tags for a client or an end-user device.

FIG. 2 is a diagram further illustrating the example environment 100 of FIG. 1A and FIG. 1B, where the data structure 120 is accessed at the token level to generate Speech Synthesis Markup Language (SSML) tags for the client 104 or an end-user device. The system 102 includes an extraction module 202 configured to extract different types of the contextual information from the data structure 120 at the token level. As shown, the extraction module 202 extracts, for a token 110 or a group of tokens 110, the sentiment, the part of speech, whether an entity has been recognized and/or the name or label of the recognized entity, and/or whether the corresponding text is assigned to a human character 204. If the text is assigned to a human character, attributes for the human character are also extracted.

The extracted contextual information is provided to an algorithm 206 used to produce speech output characteristics for an individual token 110 or a group of tokens 110, and provide the speech output characteristics to an SSML tag generation module 208. The speech output characteristics are ones that can be defined in SSML tags 210, such as a volume, a pitch, a rate of speech, a contour, a duration, a pause before a word is spoken (e.g., a defined time period such as a half of a second), contour, etc. Accordingly, the SSML tag generation module 208 is configured to automatically generate the SSML tags 210 for a corpus of text 106 based on the analysis, implemented via natural language processing techniques, that produces contextual information such as sentiment, part of speech, recognized entities, and/or human character and attribute identification. When output, the SSML tags 210 may be associated, via a position or location indicator in the corpus of text, with a particular token or a particular group of tokens so speech can be synthesized in an efficient manner. Alternatively, the SSML tags 210 can be associated with a particular token or a particular group of tokens via a wrapping technique where the SSML tag is wrapped around the particular token or the particular group of tokens (e.g., <SSML1>happy</SSML1><SSML2>day</SSML2>).

In one example, the SSML tags 210 can be provided back to the client 104. In this way, the client 104 can improve the audio experience for its end-users by providing the SSML tags 210, along with the corpus of text, to user devices 212. Should a user enable a TTS conversion feature, the client's 104 app can use the SSML tags 210 to improve the speech synthesis and computer-based voice output 214 (e.g., via one or more speakers or headphones). In another example, the SSML tags 210 can be provided directly to user devices 212.

A user device 212 can include, but is not limited to, a game console, a desktop computer, a gaming device, a tablet computer, a personal data assistant (PDA), a mobile phone/tablet hybrid, a laptop computer, a telecommunication device, a computer navigation type client computing device such as a satellite-based navigation system including a global positioning system (GPS) device, a wearable device, a virtual reality (VR) device, an augmented reality (AR) device, an implanted computing device, an automotive computer, a network-enabled television, a thin client, a terminal, an Internet of Things (IoT) device, a work station, a media player, a personal video recorders (PVR), a set-top box, a camera, an integrated component (e.g., a peripheral device) for inclusion in a computing device, an appliance, or any other sort of computing device. In some implementations, a user device 212 includes input/output (I/O) interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display, a printer, audio speakers, a haptic output device, and the like).

The algorithm 206 applies one or more rules 216 to the extracted contextual information to produce the speech output characteristics. In one example, a rule 216 can be a hard coded rule that increases or decreases a baseline value established for a speech output characteristic (e.g., a volume, a pitch, a rate of speech, a contour, a duration, etc.) by a predetermined amount. For example, the rule 216 can define that if a noun follows an adjective that is associated with a positive sentiment (e.g., happy, excited, etc.), then the pitch of the noun or the pitch of the sentence in which the noun occurs is to increase by twenty percent compared to a baseline value. Alternatively, a hard coded rule can set a speech output characteristic to a predetermined value based on the contextual information. For example, the rule 216 can define that if a noun follows the adjective that is associated with the positive sentiment, then the volume of the noun or the volume of the sentence in which the noun occurs is set to eighty percent of a maximum volume.

Other examples can include: (i) if the sentiment for a sentence is negative (e.g. transformed to a value between 0 and 0.3), then the volume is changed to 50, (ii) if the sentiment for a sentence is negative, then insert a pause at the end of the sentence, (iii) if the token is a superlative adjective and its token sentiment is higher than a threshold value in a normalized sentiment range (e.g., 0.4), then change the rate of speech to a set speed that is "slow", (iv) if the token is a noun and its token sentiment is higher than a threshold value in a normalized sentiment range (e.g., 0.4), then change the speech rate to 0.95.

In further examples, a rule 216 can be a proportional rule that maps a piece of contextual information (e.g., a sentiment, a part of speech, a name of a recognized entity, a gender or age of a human character, etc.) to a value in a range of values established for a speech output characteristic. For example, the rate of speech for a sentence can be based on where the sentiment falls on a spectrum. Sentiments that are known to fall on the negative side of the spectrum can have an associated rate of speech that is generally slower compared to sentiments that are known to fall on the positive side of the spectrum, which have an associated rate of speech that is faster. In another example, an age of a human character can be mapped to a specific rate of speech value in a range of values. In this scenario, the mapping is implemented to capture how older people typically talk slower compared to younger people.

It is contemplated that the algorithm 206 can apply more than one rule 216 to the different types and/or pieces of context information extracted from the database 120 for an individual token, or groups of token. For instance, a first rule 216 may increase the pitch for a token 110 from a baseline value due to an "Excited" sentiment. Then a second rule 216 may further increase the pitch for the same token due to the fact that a female voice is yelling. In some examples, a rule 216 can be defined based on input from the client 104 (as represented by the arrow from client 104 back to rule(s) 216). For example, to control the manner in which the audio book is narrated, an audio book publisher can define how much a speech output characteristic deviates from a normal or baseline value.

In various examples, the hard coded and/or proportional rules 216 can be established via a machine learning approach. For example, a machine learning module 218 can use training data 220, which can be human-labeled as high quality examples of speech output, to learn the rules 216. The machine learning module 218 can analyze the training data 220 to determine optimal output characteristics based on the contextual information extracted from the training data 220 (e.g., sentiment, part of speech, recognized entities, identified human characters and attributes, etc.). As a specific example, the machine learning module 218 may learn that the token(s) 110 "very hot" are ideally spoken with a pause in between "very" and "hot".

The number of illustrated modules in FIGS. 1A, 1B, and 2 is just an example, and the number can vary higher or lower. That is, functionality described herein in association with the illustrated modules can be performed by a fewer number of modules or a larger number of modules on one device or spread across multiple devices.

FIG. 3 is a diagram illustrating example token-level entries into an example data structure 300, where each token-level entry includes contextual information such as sentiment, part of speech, entity recognition, and/or human character identification. As described above, a human character identification is associated with, or refers to, attributes. The attributes can be stored as separate columns in the same data structure 300, or can be stored in a separate attribute table 126.

As shown in FIG. 3, each entry is a row for a token included in the text "Contoso Entertainment announced a concert by Mauve in beautiful Las Vegas!". The data structure 300 includes a column for the token number 302 (e.g., 1, 2, 3, 4, 5, 6, and so forth, as illustrated), a column for the token text 304, a column for the character count in a token 306 (e.g., 7, 13, 9, 1, 6, and so forth, as illustrated), and a column for the token count (per sentence) 308 (e.g., there are 12 tokens in the example sentence). Further, the data structure 300 includes columns for the extracted contextual information based on the natural language processing. This can include a column for the sentiment 310 (e.g., the language detection module 108 has determined the whole sentence is exciting and/or assign this determined sentiment to a sentiment value), a column for the part of speech 312 (e.g., a noun, a noun, a verb, an indefinite article, and so forth, as illustrated), a column for the entity recognition 314 (e.g., is a token a recognized type of entity—such as person, location, organization, medical codes, time expressions, monetary values, percentages, etc.), and/or a column for the human character that is a source of the text or spoken language 316 (e.g., "Sue" says this sentence in the corpus of text 106). In the example, "Contoso Entertainment" and "Mauve" are recognized as organizations and "Las Vegas" is recognized as a location (e.g., a city).

Figure 4:
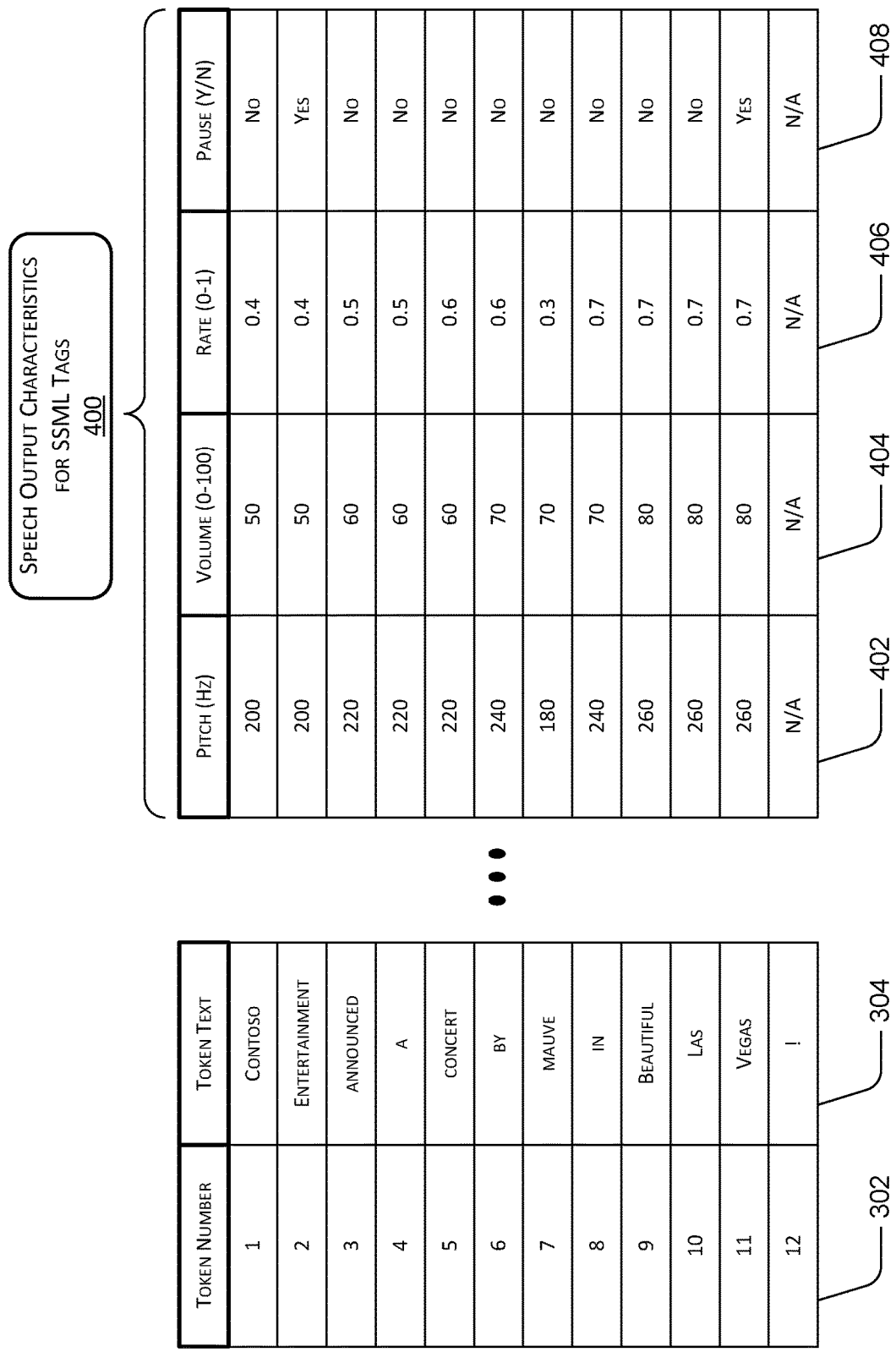
FIG. 4 is a diagram illustrating how the contextual information in FIG. 3 is used to produce speech output characteristics to be included in SSML tags generated at the token level.

As described above, the contextual information, including the sentiment, the part of speech, the recognized entities, and/or the human character, when plugged into the algorithm, has an effect on the speech output characteristics, an example of which is provided in FIG. 4. Moreover, the character count 306 and/or the token count (per sentence) 306 can also have an effect on the speech output characteristics. For instance, the audio experience may be better for end-users when longer words are spoken more slowly compared to shorter words. Thus, "Contoso" and "Entertainment" may be output at a slower speech rate compared to "concert". In another example, the audio experience may be better for end-users when longer sentences are spoken more slowly compared to shorter sentences.

FIG. 4 is a diagram illustrating how the contextual information in FIG. 3 is used to produce speech output characteristics 400 to be included in SSML tags generated at the token level. As shown, the speech output characteristics can include a pitch 402, a volume 404, a rate of speech 406, and/or a pause 408. Other speech characteristics which can be included and defined in SSML tags are also contemplated (e.g., a contour, a duration, etc.).

As shown in this example, due to the excited sentiment, the pitch, volume, and rate of speech increase as the sentence is output. The baseline pitch, volume, and rate of speech is established based on the attributes of Sue. Moreover, due to the entity recognition, there is a pause before both "entertainment" and "Vegas" are spoken. Finally, the pitch and rate of speech at which the band "Mauve" is spoken drops to "0.3" because the band name is typically spoken in this manner. Again, the content of FIG. 3 and FIG. 4 is provided as an example only, as the speech output characteristics can be adjusted in many different ways to optimize the speech synthesis based on the contextual information.

Figure 5:
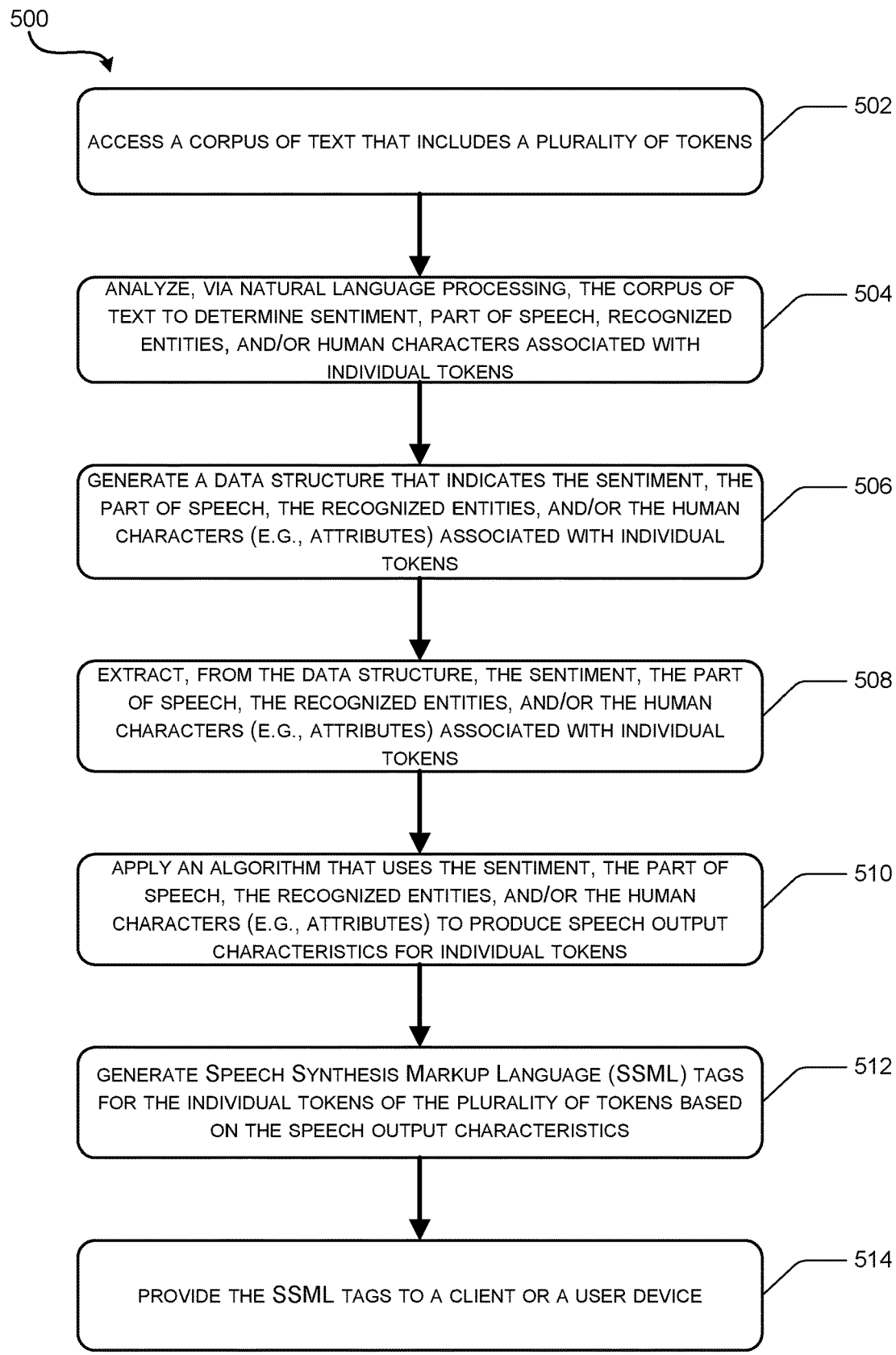
FIG. 5 is a flow diagram of an example method for determining contextual information for a corpus of text, and using the contextual information to produce speech output characteristics to be included in SSML tags.

FIG. 5 represents an example process in accordance with various examples from the description of FIGS. 1A-4. The example operations shown in FIG. 5 can be implemented on or otherwise embodied in one or more of the various devices described herein. Moreover, modules and/or components can carry out operation(s) of described example processes.

The order in which the operations are described in each example flow diagram is not intended to be construed as a limitation, and any number of the described operations can be combined in any order and/or in parallel to implement each process. Moreover, the operations in FIG. 5 can be implemented in hardware, software, and/or a combination thereof. In the context of software, the operations represent computer-executable instructions that, when executed by one or more processors, cause one or more processors to perform the recited operations. For example, modules and other components described herein can be stored in a computer-readable media and executed by at least one processor to perform the described operations. In the context of hardware, the operations can represent logic functions implemented in circuitry (e.g., datapath-control and finite-state-machine sequencing functions).

FIG. 5 is a flow diagram of an example method 500 for determining contextual information for a corpus of text, and using the contextual information to produce speech output characteristics to be included in SSML tags.

At operation 502, a corpus of text that includes a plurality of tokens is accessed. As described above, the corpus of text can include any type of text an end-user may want to listen to rather than read (e.g., a book, a messaging conversation, a news article, etc.).

At operation 504, the corpus of text is analyzed, via natural language processing, to determine sentiment, part of speech, recognized entities, and/or human characters associated with individual tokens. An individual token can include a single word or a number of N consecutive words (e.g., N=2, N=3, N=4, etc.).

At operation 506, a data structure that indicates the sentiment, the part of speech, the recognized entities, and/or the human characters (e.g., attributes) associated with the individual tokens is generated.

At operation 508, the sentiment, the part of speech, the recognized entities, and/or the human characters (e.g., attributes) associated with the individual tokens is extracted from the data structure.

At operation 510, an algorithm that uses the sentiment, the part of speech, the recognized entities, and/or the human characters (e.g., attributes) is applied to produce speech output characteristics for the individual tokens. As described above, the algorithm can include rules that map, or transform, the sentiment, the part of speech, the recognized entities, and/or the human characters (e.g., attributes) into values for the speech output characteristics.

At operation 512, Speech Synthesis Markup Language (SSML) tags are generated for the individual tokens based on the speech output characteristics.

At operation 514, the SSML tags are provided to a client and/or a user device. When provided, the SSML tags may be associated, via a position or location indicator in the corpus of text, with a particular token or a particular group of tokens so speech can be synthesized in an efficient manner. Alternatively, the SSML tags can be associated with a particular token or a particular group of tokens via a wrapping technique where the SSML tag is wrapped around the particular token or the particular group of tokens (e.g., <SSML1>happy</SSML1><SSML2>day</SSML2>).

Figure 6:
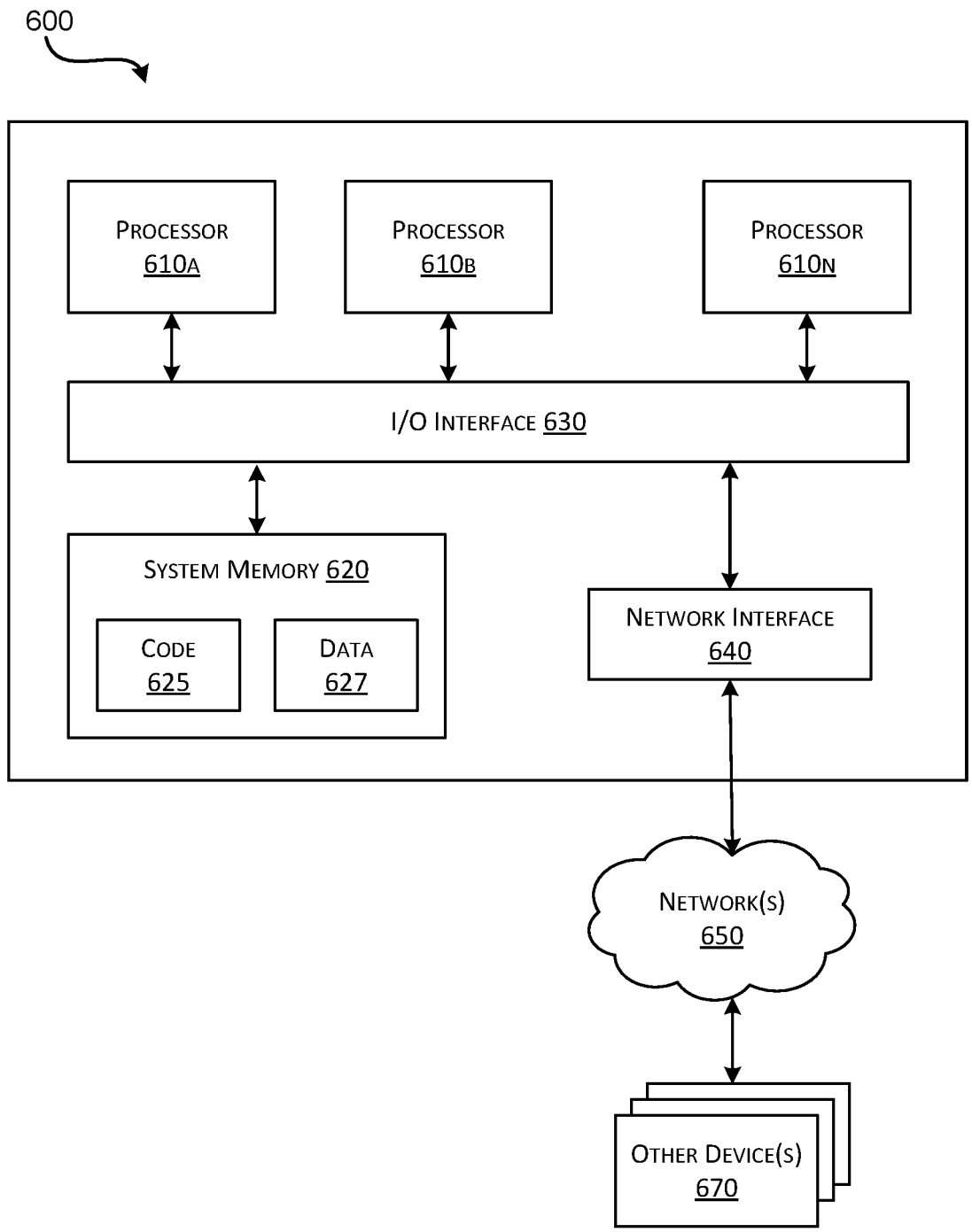
FIG. 6 is an example computing system capable of implementing the techniques of the present disclosure.

FIG. 6 illustrates a general-purpose computing device 600. In various examples, device 600 can be a server computer or any other sort of computing device that can serve as a physical host or other sort of computing device in a network system. In the illustrated embodiment, computing device 600 includes one or more processors 610a, 610b, and/or 610n (which may be referred herein singularly as "a processor 610" or in the plural as "the processors 610") coupled to a system memory 620 via an input/output (I/O) interface 630. Computing device 600 further includes a network interface 640 coupled to the I/O interface 630. In various embodiments, the processors 610 can be the processing cores described above.

In various embodiments, computing device 600 may be a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x77, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor(s) 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those routines, techniques and data described above, are shown stored within system memory 620 as code 625 and data 627.

In one embodiment, the I/O interface 630 may be configured to coordinate I/O traffic between the processor 610, system memory 620, and any peripheral devices in the device, including network interface 640 or other peripheral interfaces. In some embodiments, the I/O interface 630 may perform any necessary protocol, timing, or other data transformations to convert data signals from one component (e.g., system memory 620) into a format suitable for use by another component (e.g., processor 610). In some embodiments, the I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. Also, in some embodiments some or all of the functionality of the I/O interface 630, such as an interface to system memory 620, may be incorporated directly into processor 610.

Network interface 640 may be configured to allow data to be exchanged between computing device 600 and other device or devices 670 attached to a network or network(s) 650, such as other computer systems or components illustrated in FIGS. 1A-4, for example. In various embodiments, network interface 640 may support communication via any suitable wired or wireless general data networks. Additionally, network interface 640 may support communication via telecommunications/telephony networks such as analog voice networks or digital fiber communications networks, via storage area networks such as Fibre Channel SANs or via any other suitable type of network and/or protocol.

Network(s) 650 may include, for example, public networks such as the Internet, private networks such as an institutional and/or personal intranet, or some combination of private and public networks. Network(s) 650 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, 5G and so forth) or any combination thereof. Network(s) 650 may utilize communications protocols, including packet-based and/or datagram-based protocols such as Internet protocol ("IP"), transmission control protocol ("TCP"), user datagram protocol ("UDP"), or other types of protocols. Moreover, network(s) 650 may also include a number of devices that facilitate network communications and/or form a hardware basis for the networks, such as switches, routers, gateways, access points, firewalls, base stations, repeaters, backbone devices, and the like.

In some embodiments, system memory 620 may be one embodiment of a computer-accessible medium configured to store program instructions and data as described above for FIGS. 1A-5. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 600 as system memory 620 or another type of memory. Further, a computer-accessible medium may include transmission media or signals such as electrical, electromagnetic or digital signals, conveyed via a communication medium such as a network and/or a wireless link, such as may be implemented via network interface 640.

Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "system" and/or "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 6, may include other components that are not explicitly shown in FIG. 6, or may utilize an architecture completely different than that shown in FIG. 6.

The disclosure presented herein also encompasses the subject matter set forth in the following clauses.

Example Clause A, a method comprising: accessing a corpus of text that includes a plurality of tokens; analyzing, via natural language processing implemented by one or more processors, the corpus of text to determine sentiment and part of speech for individual tokens of the plurality of tokens; generating a data structure that indicates the sentiment and the part of speech for the individual tokens of the plurality of tokens; extracting, from the data structure, the sentiment and the part of speech for the individual tokens of the plurality of tokens; applying an algorithm that uses the sentiment and the part of speech, extracted from the data structure, to produce speech output characteristics for the individual tokens of the plurality of tokens; generating Speech Synthesis Markup Language (SSML) tags for the individual tokens of the plurality of tokens based on the speech output characteristics; and providing the SSML tags, wherein an individual SSML tag is associated with at least one token.

Example Clause B, the method of Example Clause A, wherein the speech output characteristics for each token comprise at least one of a volume, a pitch, a rate, a contour, a duration, or a pause.

Example Clause C, the method of Example Clause A or Example Clause B, wherein the algorithm comprises a rule that increases or decreases a baseline value established for at least one speech output characteristic by a predetermined amount based on at least one of the sentiment or the part of speech.

Example Clause D, the method of Example Clause A or Example Clause B, wherein the algorithm comprises a rule that sets at least one speech output characteristic to a predetermined value based on at least one of the sentiment or the part of speech.

Example Clause E, the method of Example Clause A or Example Clause B, wherein the algorithm comprises a rule that maps at least one of the sentiment or the part of speech to a value in a range of values established for at least one speech output characteristic.

Example Clause F, the method of any one of Example Clauses A through E, wherein the corpus of text comprises a plurality of human characters that speak or write, and the method further comprises: analyzing the corpus of text to identify the plurality of human characters and attributes for the plurality human characters, wherein an individual attribute includes gender, age, nationality, or type of personality; determining words that are spoken or written by an individual human character of the plurality of human characters; adding an identity of the individual human character and the attributes for the individual human character to the data structure; and extracting, from the data structure, the identity of the individual human character and the attributes for the individual human character, wherein application of the algorithm further uses the attributes for the individual human character to produce the speech output characteristics for the individual tokens of the plurality of tokens.

Example Clause G, the method of any one of Example Clauses A through F, further comprising: analyzing the corpus of text to recognize an entity, wherein the entity comprises a person, a place, a location, an establishment, a monument, or an organization; adding a name of the entity to the data structure; and extracting, from the data structure, the name of the entity, wherein application of the algorithm further uses the name of the entity to produce the speech output characteristics for the individual tokens of the plurality of tokens.

Example Clause H, the method of any one of Example Clauses A through G, wherein a token comprises a text string between two spaces or instances of punctuation.

Example Clause I, the method of any one of Example Clauses A through G, wherein a token comprises a predefined number of words.

Example Clause J, the method of any one of Example Clauses A through I, wherein the part of speech comprises a noun, a verb, an adjective, an adverb, a pronoun, a preposition, a conjunction, or an interjection.

Example Clause K, the method of any one of Example Clauses A through J, wherein the sentiment comprises at least one of happy, sad, angry, surprised, excited, fearful, shameful, disgusted, anticipation, confident, pity, awkward, hesitant, loving, or neutral.

Example Clause L, the method of any one of Example Clauses A through K, wherein the individual SSML tag is associated with the at least one token via a token position indicator that identifies the at least one token.

Example Clause M, the method of any one of Example Clauses A through K, wherein the individual SSML tag is associated with the at least one token by wrapping the individual SSML tag around at least one token.

Example Clause N, a system comprising: one or more processors; and computer storage media storing instructions that, when executed by the one or more processors, cause the system to perform operations comprising: accessing a corpus of text that includes a plurality of tokens; analyzing, via natural language processing, the corpus of text to determine sentiment and part of speech for individual tokens of the plurality of tokens; applying an algorithm that uses the sentiment and the part of speech to produce speech output characteristics for the individual tokens of the plurality of tokens; and generating Speech Synthesis Markup Language (SSML) tags for the individual tokens of the plurality of tokens based on the speech output characteristics.

Example Clause O, the system of Example Clause N, wherein the speech output characteristics for each token comprise at least one of a volume, a pitch, a rate, a pause, a contour, or a duration.

Example Clause P, the system of Example Clause N or Example Clause O, wherein the algorithm comprises a rule that at least one of: increases or decreases a baseline value established for at least one speech output characteristic by a predetermined amount based on at least one of the sentiment or the part of speech; sets at least one speech output characteristic to a predetermined value based on at least one of the sentiment or the part of speech; or maps at least one of the sentiment or the part of speech to a value in a range of values established for at least one speech output characteristic.

Example Clause Q, the system of any one of Example Clauses N through P, wherein the corpus of text comprises a plurality of human characters that speak in the corpus of text, and the operations further comprise: analyzing the corpus of text to identify the plurality of human characters and attributes for the plurality human characters, wherein: an individual attribute includes gender, age, nationality, or type of personality; application of the algorithm further uses the attributes for the plurality of human characters to produce the speech output characteristics for the individual tokens of the plurality of tokens.

Example Clause R, the system of any one of Example Clauses N through Q, further comprising analyzing the corpus of text to recognize an entity, wherein: the entity comprises a person, a place, a location, an establishment, a monument, or an organization; and application of the algorithm further uses the entity to produce the speech output characteristics for the individual tokens of the plurality of tokens.

Example Clause S, a system comprising: one or more processors; and computer storage media storing instructions that, when executed by the one or more processors, cause the system to perform operations comprising: accessing a corpus of text that includes a plurality of tokens; analyzing, via natural language processing, the corpus of text to identify individual human characters of a plurality of human characters and attributes for the individual human characters of the plurality of human characters, wherein an individual attribute includes gender, age, nationality, or type of personality; applying an algorithm that uses the attributes for the individual human characters to produce speech output characteristics for individual tokens of the plurality of tokens; and generating Speech Synthesis Markup Language (SSML) tags for the individual tokens of the plurality of tokens based on the speech output characteristics.

Example Clause T, the system of Example Clause S, wherein a token comprises a text string between two spaces or instances of punctuation.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different tokens, two different speech output characteristics, etc.).

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
    training a machine learning module to determine a rule for establishing a value for a particular speech output characteristic based on contextual information extracted from labeled training data;
    accessing a corpus of text that includes a plurality of tokens;
    analyzing, via natural language processing implemented by one or more processors, the corpus of text to categorize sentiment and part of speech for individual tokens of the plurality of tokens;
    generating a data structure that indicates a category of the sentiment and a category of the part of speech for the individual tokens of the plurality of tokens, wherein the category of the part of speech comprises a noun, a verb, an adjective, an adverb, a pronoun, a preposition, a conjunction, or an interjection;
    extracting, from the data structure, the category of the sentiment and the category of the part of speech for the individual tokens of the plurality of tokens;
    applying an algorithm that uses the category of the sentiment and the category of the part of speech, extracted from the data structure, to produce speech output characteristics for the individual tokens of the plurality of tokens;
    establishing, based on the rule used in the application of the algorithm, the value for the particular speech output characteristic based on the category of the sentiment and the category of the part of speech;
    generating Speech Synthesis Markup Language (SSML) tags for the individual tokens of the plurality of tokens based on the speech output characteristics; and
    providing the SSML tags and the corpus of text to a computing device configured to generate a computer-based voice output, wherein an individual SSML tag is associated with at least one token.

2. The method of claim 1, wherein the speech output characteristics for each token comprise at least one of a volume, a pitch, a rate, a contour, a duration, or a pause.

3. The method of claim 1, wherein the rule increases or decreases a baseline value established for the particular speech output characteristic by a predetermined amount.

4. The method of claim 1, wherein the rule sets the particular speech output characteristic to a predetermined value.

5. The method of claim 1, wherein the rule maps at least one of the category of the sentiment or the category of the part of speech to the value in a range of values established for the particular speech output characteristic.

6. The method of claim 1, wherein the corpus of text comprises a plurality of human characters that speak or write, and the method further comprises:
    analyzing the corpus of text to identify the plurality of human characters and attributes for the plurality human characters, wherein an individual attribute includes gender, age, nationality, or type of personality;
    determining words that are spoken or written by an individual human character of the plurality of human characters;
    adding an identity of the individual human character and the attributes for the individual human character to the data structure; and
    extracting, from the data structure, the identity of the individual human character and the attributes for the individual human character, wherein application of the algorithm further uses the attributes for the individual human character to produce the speech output characteristics for the individual tokens of the plurality of tokens.

7. The method of claim 1, further comprising:
    analyzing the corpus of text to recognize an entity, wherein the entity comprises a person, a place, a location, an establishment, a monument, or an organization;
    adding a name of the entity to the data structure; and
    extracting, from the data structure, the name of the entity, wherein application of the algorithm further uses the name of the entity to produce the speech output characteristics for the individual tokens of the plurality of tokens.

8. The method of claim 1, wherein a token comprises a text string between two spaces or instances of punctuation.

9. The method of claim 1, wherein a token comprises a predefined number of words.

10. The method of claim 1, wherein the category of the sentiment comprises at least one of happy, sad, angry, surprised, excited, fearful, shameful, disgusted, anticipation, confident, pity, awkward, hesitant, loving, or neutral.

11. The method of claim 1, wherein the individual SSML tag is associated with the at least one token via a token position indicator that identifies the at least one token.

12. The method of claim 1, wherein the individual SSML tag is associated with the at least one token by wrapping the individual SSML tag around at least one token.

13. A system comprising:
one or more processors; and
computer storage media storing instructions that, when executed by the one or more processors, cause the system to perform operations comprising:
training a machine learning module to determine a rule for establishing a value for a particular speech output characteristic based on contextual information extracted from labeled training data;
accessing a corpus of text that includes a plurality of tokens;
analyzing, via natural language processing, the corpus of text to categorize sentiment and part of speech for individual tokens of the plurality of tokens, wherein the part of speech comprises a noun, a verb, an adjective, an adverb, a pronoun, a preposition, a conjunction, or an interjection;
applying an algorithm that uses a category of the sentiment and a category of the part of speech to produce speech output characteristics for the individual tokens of the plurality of tokens;
establishing, based on the rule used in the application of the algorithm, the value for the particular speech output characteristic based on the category of the sentiment and the category of the part of speech;
generating Speech Synthesis Markup Language (SSML) tags for the individual tokens of the plurality of tokens based on the speech output characteristics; and
providing the SSML tags and the corpus of text to a computing device configured to generate a computer-based voice output, wherein an individual SSML tag is associated with at least one token.

14. The system of claim 13, wherein the speech output characteristics for each token comprise at least one of a volume, a pitch, a rate, a pause, a contour, or a duration.

15. The system of claim 13, wherein the rule at least one of:
increases or decreases a baseline value established for the particular speech output characteristic by a predetermined amount;
sets the particular speech output characteristic to a predetermined value; or
maps at least one of the category of the sentiment or the category of the part of speech to the value in a range of values established for the particular speech output characteristic.

16. The system of claim 13, wherein the corpus of text comprises a plurality of human characters that speak in the corpus of text, and the operations further comprise:
analyzing the corpus of text to identify the plurality of human characters and attributes for the plurality human characters, wherein:
an individual attribute includes gender, age, nationality, or type of personality;
application of the algorithm further uses the attributes for the plurality of human characters to produce the speech output characteristics for the individual tokens of the plurality of tokens.

17. The system of claim 13, further comprising analyzing the corpus of text to recognize an entity, wherein:
the entity comprises a person, a place, a location, an establishment, a monument, or an organization; and
application of the algorithm further uses the entity to produce the speech output characteristics for the individual tokens of the plurality of tokens.

18. Computer storage media storing instructions that, when executed by one or more processors, cause a system to perform operations comprising:
training a machine learning module to determine a rule for establishing a value for a particular speech output characteristic based on contextual information extracted from labeled training data;
accessing a corpus of text that includes a plurality of tokens;
analyzing, via natural language processing, the corpus of text to categorize sentiment and part of speech for individual tokens of the plurality of tokens;
applying an algorithm that uses a category of the sentiment and a category of the part of speech to produce speech output characteristics for the individual tokens of the plurality of tokens, wherein the category of the part of speech comprises a noun, a verb, an adjective, an adverb, a pronoun, a preposition, a conjunction, or an interjection;
establishing, based on the rule used in the application of the algorithm, the value for the particular speech output characteristic based on the category of the sentiment and the category of the part of speech;
generating Speech Synthesis Markup Language (SSML) tags for the individual tokens of the plurality of tokens based on the speech output characteristics; and
providing the SSML tags and the corpus of text to a computing device configured to generate a computer-based voice output, wherein an individual SSML tag is associated with at least one token.

19. The computer storage media of claim 18, wherein the rule at least one of:
increases or decreases a baseline value established for the particular speech output characteristic by a predetermined amount;
sets the particular speech output characteristic to a predetermined value; or
maps at least one of the category of the sentiment or the category of the part of speech to the value in a range of values established for the particular speech output characteristic.

* * * * *